(12) United States Patent
Chen

(10) Patent No.: US 6,595,241 B2
(45) Date of Patent: Jul. 22, 2003

(54) PREFABRICATED ELEMENTS FOR THERMAL MAINTENANCE OF INDUSTRIAL PIPE

(76) Inventor: Yaron Chen, Hamered St. 20, Beer Sheva (IL)

( * ) Notice: Subject to any disclaimer, the term of this patent is extended or adjusted under 35 U.S.C. 154(b) by 0 days.

(21) Appl. No.: 10/152,635

(22) Filed: May 23, 2002

(65) Prior Publication Data

US 2002/0189695 A1 Dec. 19, 2002

(30) Foreign Application Priority Data

Jun. 10, 2001 (IL) .................................................. 143657

(51) Int. Cl.[7] .................................................. F15D 1/14
(52) U.S. Cl. ..................... 138/38; 138/148; 138/157; 165/96; 165/154
(58) Field of Search ................ 138/38, 104, 148, 138/157; 165/96, 154

(56) References Cited

U.S. PATENT DOCUMENTS

| | | | | |
|---|---|---|---|---|
| 825,905 | A | * 7/1906 | Hellyer | 165/120 |
| 1,226,107 | A | * 5/1917 | Neville | 165/52 |
| 2,979,310 | A | * 4/1961 | Nicholson | 165/143 |
| 3,719,173 | A | * 3/1973 | Viessmann | 165/154 |
| 3,889,715 | A | 6/1975 | Lilja et al. | |
| 4,497,365 | A | * 2/1985 | Boyer | 165/164 |
| 4,832,262 | A | * 5/1989 | Robertson | 165/52 |
| 5,143,152 | A | * 9/1992 | Catelli | 165/154 |
| 5,385,299 | A | * 1/1995 | Zawada | 165/154 |
| 5,522,453 | A | * 6/1996 | Green | 165/41 |

FOREIGN PATENT DOCUMENTS

EP 0764810 3/1997

OTHER PUBLICATIONS

KWH Tech. Ltd. Thermopipe, Wehotek Industrial Pipes, Product Sortiment, publication date unknown but no later than May 5, 2001. (page 1 only).
CSI Bolt–On Technology, Controls Southeast Producxt—Contro Trace—publiaction date unknown but no later than May 5, 2001.
ControHeat Thermal Cement, CSI Bulletin TC–11 Clamp-On Steam Jackets—publication date unknown but no later than May 5, 2001.
Stubblefield, Jr., Fred—Engineering Practice, Chemical Engineering 1993—1 page.

* cited by examiner

Primary Examiner—James Hook
(74) Attorney, Agent, or Firm—Blank Rome LLP

(57) ABSTRACT

A means for thermal maintenance of industrial pipe by virtue of a working medium passing through at least one prefabricated hollow element attachable to the outside surface of the pipe wall is disclosed. The hollow element comprises an outer cover defined by an inner portion, facing the external surface of the pipe wall, an outer portion, situated opposite the inner portion and facing outwardly and transition portions connecting the inner portion with the outside portion. The inner portion is provided with concave configuration defined by radius $R_1$ and closely matching the curvature of the pipe. The inner portion encloses about 180 degrees of the pipe's external surface and the transition portions are rounded by radius r, wherein $r < R_1$.

5 Claims, 5 Drawing Sheets

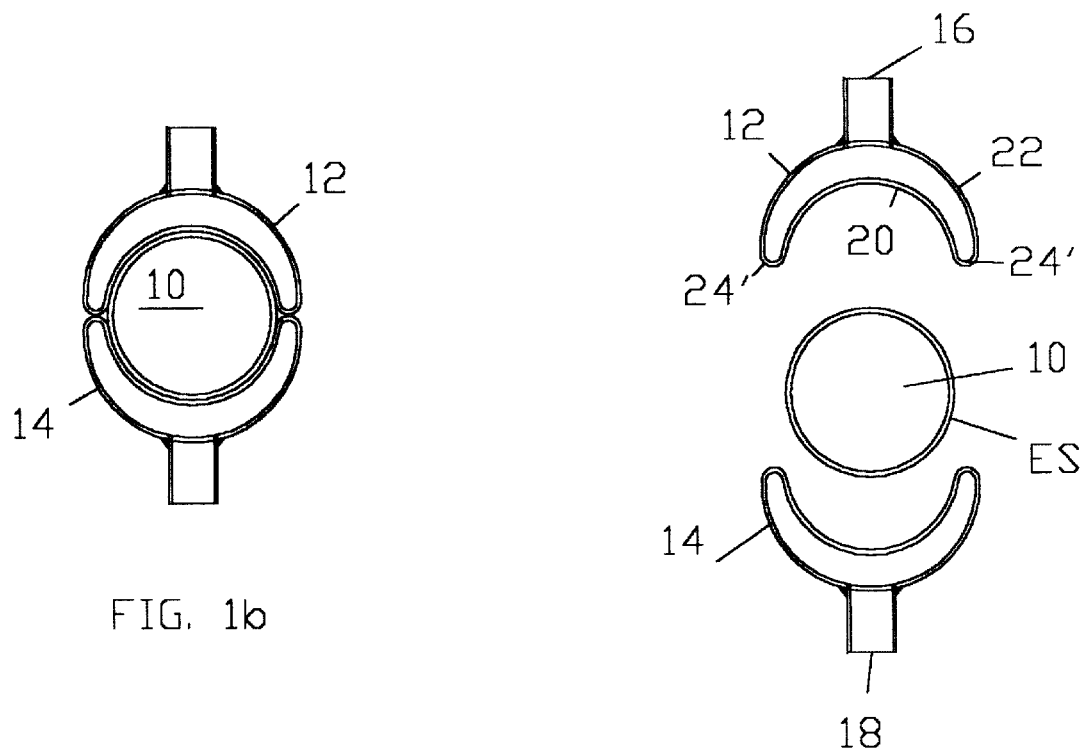
FIG. 1b
FIG. 1a
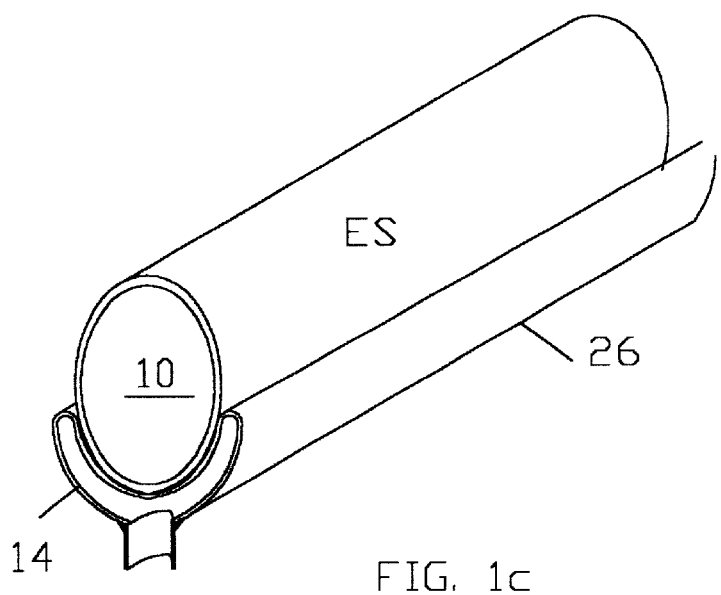
FIG. 1c

α < 180 DEGREES

α = 180 DEGREES

α > 180 DEGREES $0 < R1 < 500$ MM $0 < R2 < 550$ MM $0 < r1 < 100$ MM

PREFABRICATED ELEMENTS FOR THERMAL MAINTENANCE OF INDUSTRIAL PIPE

BACKGROUND OF THE INVENTION

1. Field of the Invention

The present invention relates to devices for keeping the content of a pipe at required temperature by attaching to the pipe hollow prefabricated elements, through which flows a medium, having temperature at which the content of the pipe should be kept. In accordance with the present invention by thermal maintenance here is meant insulating and/or heating and/or cooling of the content of industrial plant pipes through which process fluids are flowing. Among the fluids could be gases, vapors, suspensions or slurries etc. that have inherent temperature characteristics, which allow them to freeze, become viscous or condense at normal ambient temperature and therefore special thermal maintenance measures should be taken in order to prevent those undesirable phenomena.

2. Description of the Related Art

There are known various measures, used in industry for thermal maintenance of pipes as required for the storage and transfer of fluids through piping and equipment. Comprehensive survey of those measures used for heating and referred to as steam tracing can be found for example on the Internet.

For steam tracing usually jacketed tracing systems are employed, which in fact are extended versions of the known double pipe heat exchangers. It should be mentioned however that not only steam is used in jacketed systems as a heating medium, but also other fluids. A typical example of jacketed piping system can be found in monograph Chemical Engineering, June 1993, by McGraw-Hill Inc. Furthermore instead of passing fluid medium the content of the jacket can be filled by insulating material, e.g. as it is described in U.S. Pat. No. 3,889,715. An example of such jacketed system is Wehotec® industrial pipes manufactured by KWH Tech. Ltd.

There exist many disadvantages associated with the jacketed tracing systems in general and with those intended for steam tracing in particular. Among the disadvantages are:

Danger of penetration of the heating medium through pipe wall followed by interaction with the pipe content. The interaction in some cases may be accompanied by explosion. It should be mentioned that the penetration through the pipe wall cannot be detected and thus prevented.

Complicate and expensive installation and maintenance of the whole jacket system, since during the installation many complicate welding operations should be carried out and therefore extensive labor is required.

Some piping systems cannot be jacketed e.g. if the pipes are coated by a glass coating since jacket cannot be welded to such pipes.

The installation step may be associated with deterioration or damage of the process pipe and therefore with the necessity to perform additional operations for correcting the damage.

The installation of the jacket tracing system should be carried out always simultaneously with the installation of the pipe itself. Thus the construction schedule becomes less flexible.

The already installed jacket system cannot be recycled.

There exist also other means for thermal maintenance of the content of industrial pipes. Among these means one can mention co-called electrical tracing, employing attaching of electrically conductive elements to the outside surface of the pipe wall. Unfortunately electrical tracing is suitable only for heating. Furthermore this measure is associated with the necessity in compulsory grounding and explosion protection, which makes this measure not always feasible, expensive and very prone to mechanical damage.

There is known also insulating and/or heating and/or cooling system as disclosed in EP764810. This system comprises independent, prefabricated modular elements configured as a duplex pipe, forming a jacket. This system is used for the insulating of small and medium size diameter piping systems. The fluid medium heats or cools the process fluid in single or multiple sequences by flowing through the jacket.

The drawback of this solution is associated with the complexity of design of the modular elements. The elements are configured as pipe and plate, provided at one end of its external surface with longitudinal channel sections apt to lodge a structural shape for articulated joining of two adjacent elements to form an assembly of modular elements enveloping the equipment to be insulated. The cross-sectional configuration of the elements is provided with sharp and not rounded edges and therefore is not suitable for keeping considerable pressure of the fluid medium flowing through the jacket.

Furthermore the elements are designed in such a manner that they are jointed by virtue of male and female mating sections, formed on the elements. These mating sections require precise manufacturing, and this contributes to the high cost of the whole manufacturing process.

The closest to the present invention thermal maintenance solution is so-called ControTrace Bolt-On technology developed by CSI Ltd.

According to this technology prefabricated hollow elements are attached to the outside surface of the pipe. Heating fluid is passed through the elements and thus temperature maintenance of the pipe's content is provided by virtue of conductivity. The elements are secured on the pipe by banding or bolting. The cross-section configuration of the hollow elements allows close match between the pipe's circumference and the element. This is achieved by virtue of arched configuration of that surface of the hollow element, which is adjacent to the pipe's wall. The opposite side of the hollow element is straight. One can find description of the ControTrace heating elements in CSI Bulletin F-40.

The ControTrace elements have many advantages. They are fast and easy in installation, they have high thermal capacity, they allow rapid heat transfer and they are removable and reusable. Nevertheless they have one intrinsic disadvantage associated with their size and design.

The elements are fabricated of carbon steel tubing with a concave heating surface formed to the radius of the outer diameter of the process pipe. The elements are deliberately designed that the arc length of contact between each element and the process pipe is 1.8 inches regardless the pipe size. By virtue of this ultimate design the coverage of the pipe diminishes as the pipe diameter increases. For example for the pipe diameter 2 inch the pipe coverage per element is 24%, while for the pipe diameter 16 inch the coverage is only 3.6%. Therefore the ControTrace heating elements allow coverage of not more than approximately 25% of the pipe's circumference even for pipes with small diameter. If the pipe has sufficiently larger diameter several hollow elements would be required to provide efficient thermal maintenance. It can be readily appreciated that this renders this solution expensive.

It should be also born in mind that during the installation procedure it is required to place between the element and the pipe special thermal cement, which ensures adhesion of the element before it is banded to pipe. This procedure renders the system complicate and less convenient in exploitation.

In conclusion it should be emphasized that despite the fact that numerous solutions have been devised for thermal maintenance of industrial pipes there is still felt a need for a new and improved solution, which is simple, inexpensive, convenient in manufacturing and exploitation and ensures efficient, reliable, easy and safe thermal maintenance.

OBJECT OF THE INVENTION bject of the Invention

The object of the present invention is to provide a new and improved means for thermal maintenance of industrial pipes enabling sufficiently reduce or overcome the above-mentioned drawbacks of the known in the art solutions.

In particular the main object of the present invention is to provide a new and improved thermal maintenance means, which comprises prefabricated hollow element defined by very simple configuration and therefore is inexpensive in fabrication and exploitation and at the same time ensure efficient thermal maintenance.

The further object of the present invention is to provide new and versatile thermal maintenance means, which is reliable in operation and suits to wide assortments of pipes irrespective of their diameter and material.

The third object of the present invention is to provide a new and safe thermal maintenance means, which is suitable to keep high pressure of working fluid medium passing therethrough.

Still further object of the invention is to provide new and improved prefabricated elements suitable for thermal maintenance of industrial pipes, allowing simple installation and dismantling without skilled labor.

The above and other objects and advantages of the present invention can be achieved in accordance with the following combination of its essential features.

A means for thermal maintenance of industrial pipe by virtue of a working fluid medium passing through at least one prefabricated hollow element attachable to the outside surface of the pipe wall. The hollow element comprises outer cover defined by a) an inner portion, facing the outside surface of the pipe wall, b) an outer portion, situated opposite the inner portion and facing outwardly c) a transition portions, connecting the inner portion with the outside portion.

The inner portion of the cover is provided with substantially semicircular concave configuration defined by radius $R_1$, corresponding to the curvature of the pipe.

The inner portion encloses about 180 degrees of the pipe circumference. The transition portions are rounded by a radius r, which is less than radius $R_1$. In one of the embodiments the outer cover is provided with inlet and outlet openings for entrance and exit of the working medium.

In still further embodiment the outer portion of the cover is provided with semicircular configuration defined by radius $R_2$, wherein $R_1 < R_2$.

In yet another embodiment radius $R_1$ is less than 500 mm, radius $R_2$ is less than 550 mm and radius r is less than 100 mm.

As per additional embodiment the inner portion of the cover encloses less than 180 degrees of the pipe circumference.

And in accordance with still further embodiment the inner portion of the cover encloses more than 180 degrees of the pipe circumference. The present invention in its various embodiments has only been summarized briefly.

For better understanding of the present invention as well of its advantages, reference will now be made to the following description of its embodiments with reference to the accompanying drawings.

BRIEF DESCRIPTION OF THE DRAWINGS

FIG. 1a is exploded cross-sectional view of the invention

FIG. 1b shows two hollow elements of the thermal maintenance means of the invention attached to industrial pipe FIG. 1c is an isometric view of a pipe with one prefabricated hollow element attached thereto

DETAILED DESCRIPTION OF THE PREFERRED EMBODIMENTS

Figure 2A:
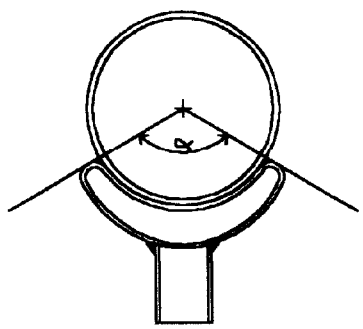
FIGS. 2a–d show various hollow elements covering the pipe

The present invention is mainly directed to thermal maintenance of industrial pipes, including both heating and cooling of the pipe, as it might be necessary to keep the pipe's content at required temperature. In accordance with the gist of the invention at least one prefabricated hollow element is attached to the pipe wall. The element comprises outer casing, through that circulates a working fluid. As it will be explained further in more details the configuration of the casing is selected in such a manner that its internal portion facing to the pipe wall has arched, concave configuration deliberately designed to closely match the curvature of the pipe's external surface and to overlap its circumference by approximately 180 degrees.

Referring to FIG. 1a is shown schematically industrial pipe 10, through which flows appropriate fluid, e.g. liquid, gas, slurry, suspension etc. (not shown). The pipe is surrounded by a couple of hollow prefabricated elements 12, 14 having their casings to be attached to the external surface ES of the pipe. The elements are provided with corresponding inlets 16, 18 and outlets (not shown) for entrance and exit of the working fluid circulating through the casings to enable thermal maintenance of the pipe. In FIG. 1b is shown the situation when the hollow elements are attached to the pipe to enclose fully its outside surface and to be in close contact with it. This is achieved by virtue of special configuration of the casings, which will be explained further. The casing of each element is defined by an inner portion, facing the outside surface of the pipe, by an opposite outer portion facing outwardly and by two transition portions connecting between the inner and outer portion. In FIG. 1a the above portions are designated only with respect to the first element 12. The second element has similar configuration, which is substantially mirror symmetrical to that of the element 12.

The inner portion of the element's casing is designated by numeral 20, the outer portion by numeral 22 and transition portions by numerals 24, 24'. FIG. 1c depicts only element 14, which casing is attached from beneath to the pipe's outside surface. In this figure is seen that the casing has also length dimension 26.

It is not shown specifically but should be appreciated that the elements are secured on the external surface of the pipe by virtue of known in the art means, e.g. stainless steel bands. In practice the elements are secured on the tube substantially by mechanical means and there is no need to apply cement layer for adhesion between the inner portion of the element's casing and the external surface of the pipe. After the elements are attached to the pipe and secured thereon an insulating layer if required can cover them.

Figure 3:
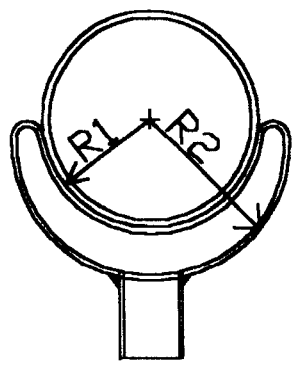
FIG. 3 shows radii of the hollow element defining its geometry
Figure 4:
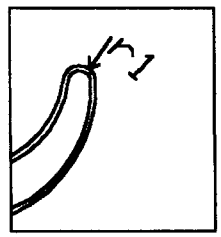
FIG. 4 is enlarged view of the transition portion of the hollow casing of the element

As best seen in FIGS. 1a, 3 and 4 the inner and outer portion of the element's casing is provided with arched concave configuration, defined by respective radii $R_1$, $R_2$. These radii are selected in accordance with the pipe diameter and in such a manner that the resulting curvature of the inner portion of the casing matches closely the curvature of the outside surface of the pipe. Since the arched cross-sectional configuration of the element shown in FIG. 3 reminds banana it will be referred-to further as banana-shaped element.

It can be readily appreciated that by virtue of the arched concave inner portion very intimate mechanical contact is established between the elements and the pipe and thus efficient thermal maintenance can be achieved.

The intermediate portions of the casing are rounded by small radius r.

Figure 5:
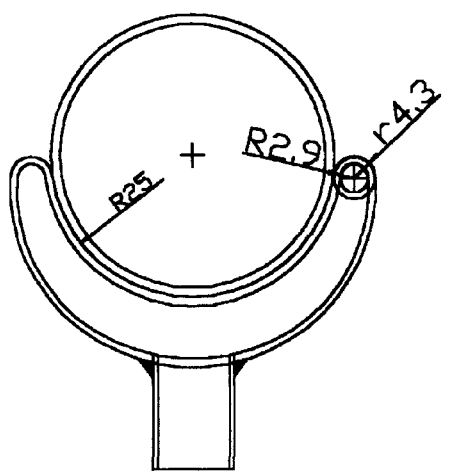
FIG. 5 is enlarged view of the hollow element attached to the tube

In FIG. 5 is shown practical example of a hollow element in accordance with the invention. This element suits industrial pipe with diameter 50 mm. Radius of the inner portion $R_1$ is 25 mm and radius of the intermediate portion r is 4.3 mm.

In practice radii of the inner, outer and transition portions are selected for the majority of industrial pipes to be in the following ranges:

Radius $R_1$ of the inner portion $0<R_1<500$ mm

Radius $R_2$ of the outer portion $0<R_2<550$ mm

Radius r of the transition portion $0<r<100$ mm.

By virtue of the arched inner and outer portions and rounded intermediate portions it is ensured that the element's casing is capable to withstand pressure of the working fluid circulating therethrough. In practice the hollow elements of the invention are resistant to pressure up to 20 atm.

Figure 2B:
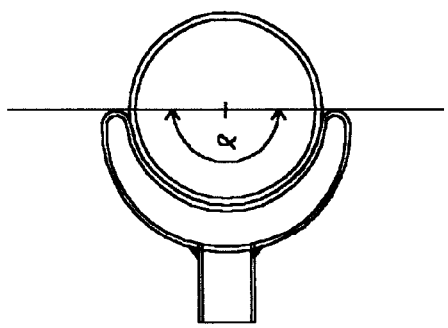
Figure 2C:
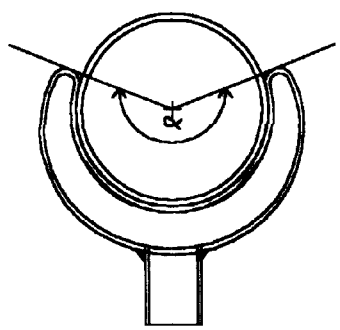

As seen in FIG. 2a the length of the arched inner portion is defined by an angle $\alpha$, confined between the radii driven from the pipe's center to the transition portion of the casing. It can be readily appreciated that this angle defines overlapping of the pipe's external surface by the element and thus the efficiency of achievable thermal maintenance. In accordance with the invention, this angle is deliberately selected to be approximately 180 degrees irrespective of the pipe diameter to overlap about 50% of the pipe's circumference. As seen in FIGS. 2a, 2b, 2c this angle can be either less than 180 degrees, or be exactly 180 degrees, or be more than 180 degrees respectively.

Figure 2D:
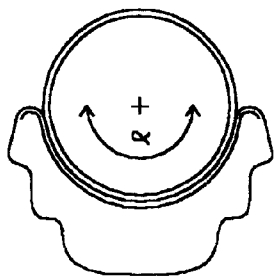

In FIG. 2d is shown additional embodiment of the hollow element of the invention in which the outer portion is not arched and therefore the whole element is not banana-shaped.

The exact value of the angle and thus the coverage of the pipe are selected in accordance with particular application.

It has been empirically proven that by virtue of the above-described banana-like cross-sectional shape the hollow elements are very simple and convenient in manufacturing and they can be easily fabricated by cold extrusion from a pipe.

Figure 6A:
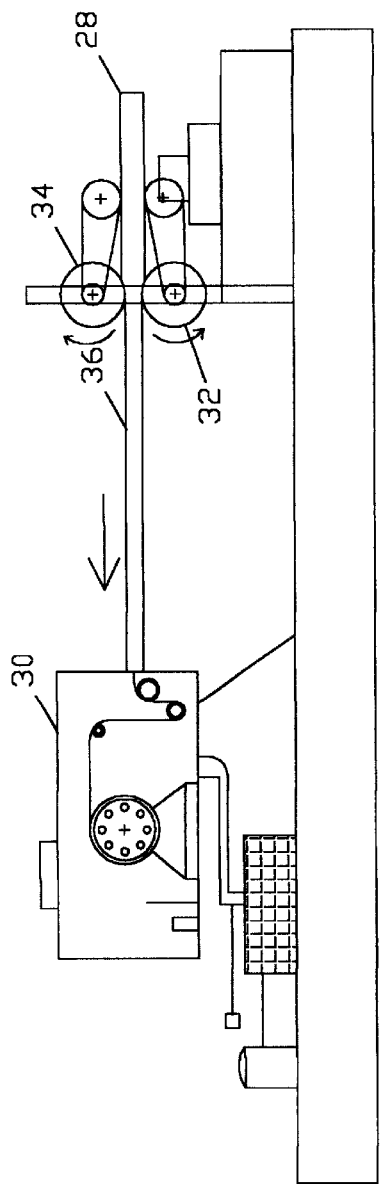
FIGS. 6a–b depict extrusion machine for prefabricating hollow elements of the invention.
Figure 6B:
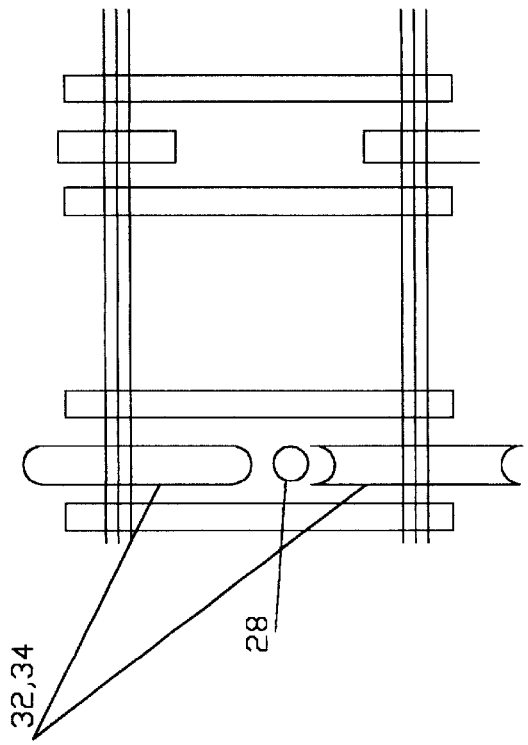

Referring now to FIGS. 6a, 6b it is shown schematically extrusion machine for manufacturing of hollow elements in accordance with the invention.

A hydraulic drive unit 30 extrudes tube 28 through a couple of profiled rollers 32, 34. The rollers are provided with a profile suitable for obtaining casing with radii $R_1$, $R_2$, r and the angle $\alpha$, as required for particular application. After the pipe exits the rollers its section 36 has required cross-sectional banana-like configuration. The profiled section is cut to the required length and ready prefabricated elements are collected and stored.

Besides of the above-listed advantages the present invention has some additional advantages as follows.

Since the prefabricated hollow elements can be manufactured with variable length the installation procedure becomes easy and flexible and so the dismantling procedure. Neither installation nor dismantling requires skilled labor. The elements can be fabricated from different materials like carbon steel, stainless steel etc.

The prefabricated elements are convenient in storing, they are ready available and their maintenance is inexpensive since they could be installed outside the plant and thus without involvement of additional subcontractors.

It has been found that the elements of the invention are especially useful for thermal maintenance of pipes in pilot installations, which running is associated with fast changes of the process parameters and frequent dismantling and reinstallation of the thermal maintenance system.

In practice hollow elements are easily extrudeable by cold extrusion on a machine capable to develop 100-ton force. The elements can be extruded from raw tube having diameter 2.5 inch and wall thickness 3 mm made of carbon steel. The elements are suitable for thermal maintenance of industrial pipe with diameter 2 inch and they can be exploited with various working mediums, like steam, hot water at 90 degrees C. and oil at 300 degrees C.

The above-described elements served in chemical installation to keep content of industrial pipe at 100 degrees C. By virtue of the elements it was possible to carry out efficient and safe thermal maintenance during 12 months without any accident.

It should be appreciated that the present invention is not limited by the above-described embodiments and that one ordinarily skilled in the art can make changes and modifications without deviation from the scope of the invention as will be defined below in the appended claims.

It should also be appreciated that features disclosed in the foregoing description, and/or in the foregoing drawings, and/or examples, and/or following claims both separately and in any combination thereof, be material for realizing the present invention in diverse forms thereof.

What is claimed:

1. A means for thermal maintenance of industrial pipe by virtue of a fluid working medium passing through at least one prefabricated hollow element attachable to the outside surface of the pipe wall, said hollow element having an integral body part suitable to cover the pipe wall, said integral body part comprising, a) an inwardly facing portion, facing the external surface of the pipe wall, b) an outwardly facing portion, c) a transition portion, smoothly conjugating the inwardly facing portion with the outwardly facing portion, wherein said inwardly facing portion is provided with a concave configuration defined by a curvature radius $R_1$, said inwardly facing portion is configured to closely match the curvature of the external surface of the pipe wall, said inwardly facing portion enclosing not more than 180 degrees of the external surface of the pipe wall, said outwardly facing portion is provided with a concave configuration and said transition portions are rounded by a radius r, wherein $r<R_1$.

2. The means as defined in claim 1, in which said hollow element is provided with an inlet opening and with outlet openings for respective entrance and exit of the working medium.

3. The means as defined in claim 2, in which said outwardly facing portion is provided with a curvature radius $R_2$, wherein $R_1<R_2$.

4. The means as defined in claim 3, in which said curvature radius $R_1$ is less than 500 mm, said curvature radius $R_2$ is less than 550 mm and said radius r is less than 100 mm.

5. The means as defined in claim 1, in which said inwardly facing portion encloses less than 180 degrees of the external surface of the pipe wall.

* * * * *